(12) United States Patent
di Marco et al.

(10) Patent No.: US 11,012,356 B2
(45) Date of Patent: *May 18, 2021

(54) METHOD OF FORWARDING A RECEIVED MESSAGE IN A MESH NETWORK COMPRISING A PLURALITY OF COMMUNICATIVELY INTERCONNECTED MESH NODES AS WELL AS A CORRESPONDING MESH NODE

(71) Applicant: Telefonaktiebolaget LM Ericsson (publ), Stockholm (SE)

(72) Inventors: Piergiuseppe di Marco, Sollentuna (SE); Per Skillermark, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/710,337

(22) Filed: Dec. 11, 2019

(65) Prior Publication Data

US 2020/0112508 A1    Apr. 9, 2020

Related U.S. Application Data

(63) Continuation of application No. 15/747,452, filed as application No. PCT/EP2017/084501 on Dec. 22, 2017, now Pat. No. 10,567,282.

(51) Int. Cl.
*H04W 28/02* (2009.01)
*H04L 12/741* (2013.01)
(Continued)

(52) U.S. Cl.
CPC .......... *H04L 45/74* (2013.01); *H04W 28/021* (2013.01); *H04W 40/246* (2013.01);
(Continued)

(58) Field of Classification Search
CPC . H04W 28/021; H04W 84/18; H04W 40/246; H04W 40/023; H04L 45/125; H04L 45/74
See application file for complete search history.

(56) References Cited

U.S. PATENT DOCUMENTS 10,182,357 B1 * 1/2019 Keating ................ H04W 24/02
2010/0157889 A1    6/2010 Aggarwal et al.
(Continued)

FOREIGN PATENT DOCUMENTS

GB        2517086 A    2/2015

OTHER PUBLICATIONS

"Understanding Z-Wave Networks, Nodes & Devices", https://web.archive.org/web/20171125210804/https://www.vesternet.com/resources/technology-indepth/understanding-z-wave-networks/, Nov. 25, 2017, pp. 1-6.

(Continued)

*Primary Examiner* — Wei Zhao
(74) *Attorney, Agent, or Firm* — Murphy, Bilak & Homiller, PLLC (57) ABSTRACT

Embodiments include methods, performed by a first mesh node, of forwarding a received message in a wireless mesh network. Such methods include receiving, from a third mesh node in the wireless mesh network, a message whose destination is a second mesh node in the wireless mesh network. Such methods also including forwarding a plurality of repetitions of the message to the second mesh node. Successive repetitions of the message are separated by respective time delays, which are based on whether the first mesh node has an established friendship relationship with the second mesh node. For example, if the first and second mesh nodes have a friendship relationship, at least three repetitions of the message are forwarded by unicast transmission, and the respective time delays are equal and are (Continued)

between 100-200 μs. Embodiments also include complementary methods performed by a second mesh node, and mesh nodes configured to perform such methods.

18 Claims, 3 Drawing Sheets

(51) Int. Cl.
*H04W 40/24* (2009.01)
*H04W 84/18* (2009.01)
*H04W 40/14* (2009.01)
*H04W 40/32* (2009.01)

(52) U.S. Cl.
CPC ............ *H04W 40/14* (2013.01); *H04W 40/32* (2013.01); *H04W 84/18* (2013.01)

(56) References Cited

U.S. PATENT DOCUMENTS

| | | |
|---|---|---|
| 2013/0170435 A1 | 7/2013 | Dinan |
| 2018/0014387 A1* | 1/2018 | Bard ................... H05B 47/19 |
| 2020/0288266 A1* | 9/2020 | Alexander ............ H04W 4/021 |

OTHER PUBLICATIONS

Di Marco, Pergiuseppe, et al., "Bluetooth Mesh Networking", https://www.ericsson.com/en/reports-and-papers/white-papers/bluetooth-mesh-networking, Jul. 22, 2017, pp. 1-12.

Ren, Kai, "Bluetooth Mesh Networking: Friendship", http://blog.bluetooth.com/bluetooth-mesh-networking-series-friendship, Aug. 24, 2017, pp. 1-10.

"Mesh Profile", Bluetooth Specification, Revision V. 1.0., Mesh Working Group, Jul. 13, 2017, pp. 1-331.

* cited by examiner

METHOD OF FORWARDING A RECEIVED MESSAGE IN A MESH NETWORK COMPRISING A PLURALITY OF COMMUNICATIVELY INTERCONNECTED MESH NODES AS WELL AS A CORRESPONDING MESH NODE

RELATED APPLICATIONS

The present Application claims priority to, and is a continuation of, U.S. application Ser. No. 15/747,452 filed Jan. 25, 2018, which is a national-stage entry of International App. PCT/EP2017/084501 filed Dec. 22, 2017. The entire content of these applications are incorporated by reference herein for all purposes.

TECHNICAL FIELD

The present invention is generally related to wireless mesh networks, more specifically to the time between transmissions of the same message in a mesh network.

BACKGROUND

A wireless mesh network, WMN, comprises a plurality of mesh nodes organized in a mesh topology. Here, each mesh node is also some sort of provider by forwarding data to the next mesh node. The network infrastructure is decentralized and simplified because each mesh node only needs to be able to transmit to a neighbouring mesh node. Such wireless mesh networks could allow people living in remote areas and small businesses operating in rural neighbourhoods to connect their networks together for affordable internet connections.

Wireless mesh network can be implemented with various wireless technologies including 802.11, 802.15, cellular technologies and Bluetooth. Bluetooth mesh networking is standardized by the Bluetooth Special Interest Group, SIG, and the first release of Bluetooth Mesh was released in July 2017. The solution is based on flooding using broadcasting over a set of shared channels referred to as the advertisement channels.

A node acting as a relay in a Bluetooth mesh network scans the advertisement channels for mesh messages. When a message is detected and received, the node checks to see if it is the destination of the message. If the node is not the destination of the node, the node checks if it has already received and forwarded the message. If yes, the message is discarded. If not, the message is forwarded in the mesh network by re-transmitting it over the advertisement channels so that the neighbours of the node can receive it. Typically some random delay is introduced before forwarding the message to avoid collisions. By means of this distributed mechanism, the message is forwarded from node to node in the network so that the message arrives at the destination.

The advertising mechanism works such that a given message is also repeated in three separate physical channels, denoted as advertising channels, opportunely spaced in frequency to guarantee robustness to frequency selective fading and interference. On the receiver side, nodes must scan all channels periodically. Therefore, it is not possible to predict in which channel a message is received. To lower the probability of message collisions on all advertising channels, the Bluetooth Mesh specification recommends randomizing the gap within consecutive messages within an advertising event. Up to 10 ms delay is allowed between each of the messages in the advertising event.

The features within the Bluetooth SIG specification enable many nodes in the mesh network to be battery-powered or to use techniques such as energy harvesting. If a node cannot scan continuously, then it is possible that it will not receive mesh messages that it should be processing. In order to facilitate the use of such nodes within a network, the concept of "Friendship" is used within the Bluetooth Mesh network by Low power nodes.

Friendship is first established and initiated by the Low Power Node. Friendship is a special relationship between a Low Power node and one neighbouring "Friend Node". These nodes must be within a single hop of one another and in the same subnet. Once friendship is established, the Friend node performs several actions that help reduce the power consumption of the Low Power node. The Friend node maintains a Friend queue for the low power node, which stores incoming messages addressed to the Low Power node.

The Friend node delivers those messages to the Low Power node when requested by the Low Power node. Also, the Friend node delivers security updates to the Low Power node. Furthermore, a Friend node may be friends with multiple Low Power nodes, but a Low Power node can only be friends with a single friend node.

Controllers, or nodes in mesh network, are typically implemented with a single-mode operation for the transmission of advertisements and today's solutions do not consider the type of advertising data to be sent. The recommendation of randomizing the gap between consecutive messages within an advertising event introduces advantages for the successful end to end delivery of mesh messages, but also increases the average delay for successful transmission, thus increasing the energy consumption at Low Power nodes.

As an example, assuming messages are sent back to back, the duration of an advertising triplet transmission is less than 1 ms. When introducing random delay between messages, the advertising triplet transmission time can exceed 20 ms.

SUMMARY

It is an object of the present disclosure to provide for a method of forwarding received messages, wherein the power consumption for the corresponding mesh nodes is reduced.

It is another object of the present disclosure to provide for a mesh node arranged for forwarding received messages, wherein the power consumption for the mesh node is reduced.

In a first aspect, there is provided a method of forwarding a received message in a mesh network comprising a plurality of communicatively interconnected mesh nodes.

The method comprising the steps of:
receiving, by a mesh node of said plurality of interconnected mesh nodes, a message to be forwarded in said mesh network;
determining, by said mesh node, that said message to be forwarded is to be unicasted to a particular neighbour mesh node of said mesh node, said particular neighbour mesh node being one hop away from said mesh node;
unicasting, by said mesh node, said message to be forwarded to said particular neighbour mesh node a plurality of times, wherein each time delay between subsequent unicasted messages is predetermined.

The present invention is based on the concept that a particular mesh node may implement a dual mode scheme.

That is, messages may be transmitted by a particular node in any of two modes. A first mode may be understood as being according to the normal practice as is currently being followed. In such a first mode, subsequent messages are transmitted one after another after waiting for a randomly generated time period. The first mode may also be referred to as a randomized mode referring to the random time period between subsequent transmissions.

In a second mode, being proposed according to the present disclosure, the node transmitting the messages waits for a predetermined fixed duration of time before transmitting subsequent packets of data to a corresponding node. The second mode may also be referred to as a compact mode. It was the insight of the inventors that it might be advantageous to employ said second mode of transmitting in the context of messages being transmitted to a Low power node from a friend node. Alternately, the compact mode may also be utilized when it is determined by the node that the message is to be unicasted and not broadcasted by the node. If the node has to transmit the message to a particular node that is one hop away in the mesh network from the node device, then a compact mode of transmission may be selected.

The main reason for employing a randomized mode is to avoid possible collisions between messages in the advertisement channel and loss in data when being transmitted. However, when there is only one intended receiver and the nodes are within one hop of each other, there is less chance of collisions between messages and hence a compact mode may be preferred.

The inventors considered that when messages are being transmitted in randomized mode, the total time to send all the messages is too large and correspondingly, the node receiving said messages has to remain ON so as to receive said messages.

For normal nodes, that always stay ON, the time taken to transmit the messages may not be an issue. In the context of the present disclosure, a normal node may be understood as not being a Low-Power node as specified within the Bluetooth Low Energy, BLE, standard or as one being powered by a mains power supply. But the Bluetooth mesh networking standard also provides for the possibility of Low power nodes that are powered by a battery or use energy harvesting means. Such nodes only switch ON for a brief period of time before being turned OFF again. In such scenarios it is advantageous to reduce the time of transmission, thereby reducing the duration of time for which the Low power node has to be active or switched ON. An advantage of the method according to the present disclosure, is to reduce the power consumption of an associated Low Power node while guaranteeing high reliability for messages being relayed in the mesh network. The term reliability may be understood to mean, in this context, that messages being transmitted are reliably received at the intended destination node.

The inventors, therefore consider it advantageous to determine whether the messages to be transmitted by a node are to be unicasted, and if they are to be unicasted, a compact mode of transmission is selected. Therefore, according to the method proposed by the present disclosure, upon receiving the messages, the node determines that the messages are to be unicasted to a node and subsequently selects a compact mode of transmission. By selecting a compact mode of transmission, the Low Power node needs to remain ON only for a shorter duration of time, thereby conserving energy.

Messages that are not intended for processing at a single receiver, e.g., messages to be flooded, benefit from randomization of the advertising event, whereas messages intended for processing at a single receiver, e.g., messages from a Friend to a Low Power node, benefit from compact transmission (i.e., with minimum delay within the event).

The proposed solution according to the present disclosure consists of a dual-mode controller that:
   determines if an outgoing message benefits from advertising triplet randomization or compact transmission, by e.g., inspecting the unencrypted portion of the message header.
   transmits each message according to the determination above.

The operation of the Controller can be either initiated by the Host, using proprietary messages in the Host-Controller Interface (HCI), or autonomously determined at the controller without requiring information from the host, in compliance with existing stack implementations of Mesh 1.0 specifications.

In an embodiment according to the present disclosure, the step of unicasting comprises:
   unicasting, by said mesh node, said message to be forwarded to said particular neighbour mesh node at least three times, wherein each time delay between subsequent unicasted messages is equal.

In order to improve the robustness of the network, a message to be transmitted is sent by a node at least three time. Such a repetition of messages occurs over different advertisement channels in order to ensure that the message is received by the intended receiver. According to the present disclosure, if a compact mode is selected, the time delay between unicasting the same message over the same or different advertisement channels is also kept constant.

In an embodiment according to the present disclosure, each time delay is between 100 µs and 200 µs. It was the insight of the inventors that the time delay between subsequent transmission is preferably between 100 µs and 200 µs. The time delay for a randomized mode is randomly selected and is usually in between 100 µs and 10 ms. On an average, 15 ms, is the delay for receiving a message by a destination node assuming that the receiver is tuned on a random channel for receiving. Therefore, a compact mode of transmission is significantly shorter than a randomized mode.

According to an example of the present disclosure, the mesh node and said particular neighbour mesh node have an established friendship relationship. The compact mode of transmission is particularly beneficial in case of unicasting to a low power node with whom a Friendship relationship has been established.

In an embodiment of the present disclosure, the step of determining comprises:
   determining, by said mesh node, that a friendship relationship is established between said particular neighbour mesh node and said mesh node. Instead of determining if the message is to be unicast, the node may also determine whether the message is directed towards a node with which the node has an established Friendship relationship. Once the node determines that the messages are to be transmitted to low power node with which the node has an established friendship, a compact mode of transmission is selected.

According to an embodiment of the present disclosure, the step of determining comprises:
   comparing a Network identifier field in a header portion of said received message to a corresponding field of messages to be transmitted;
   determining that said messages are to be unicasted when said two network identifiers are different.

It was the insight of the inventors to use the Network Identifier, NID, field as one way of determining whether to employ a compact mode or a randomized mode. Messages generated within Friendship use separate security material, and therefore a different NID, specifically derived for the Friend-Low Power node pair. Therefore, after comparing the NID fields of an incoming message and message to be transmitted, if they are found to be different, it may be inferred that the message to be transmitted was generated in the context of Friendship relationship. Therefore, a compact mode of transmission is selected. If, however, the NID of the incoming message is the same as the message to be transmitted, it is determined that the message is to be broadcasted by the node within the mesh network, and therefore the randomized mode is selected.

In an embodiment, exemplified in the context of Mesh messages, the Controller autonomously determines the nature of the message to be sent by collecting NID values from incoming messages in the network and comparing it with the NID value of the messages to be transmitted. If the same NID is used for incoming and outgoing messages, it means that the message belongs to a Mesh subnet and it is intended to be broadcast to multiple receivers. If the NID used for outgoing messages is not used by any other node, it indicates that the message has been generated in the context of Friendship between the node generating the message and a single receiving node, which can be a Low Power node In an embodiment according to the disclosure, the method further comprises the step of:
receiving, by said node, a polling signal from said particular neighbour mesh node, wherein said polling signal indicates to said node that said particular neighbour mesh node is active and is able receive messages. Especially in the context of friendship, it is preferable that the low power node indicates to the friend node that the low power node is active and is ready to receive any messages. The low power node may do so by sending a polling signal to the friend node.

In an embodiment according to the disclosure, the Host layer informs the Controller about the nature of the message by sending a command through the Host-Controller Interface. The controller operates with a first mode (e.g., randomized mode) by default. The command is sent by the Host to enable and disable the operation according to the second mode (e.g., compact mode).

According to a further embodiment of the present disclosure, higher layers in the networked layer architecture may send a command to indicate that the message is to be forwarded to a single destination, thereby indicating that a compact mode according to the present disclosure is to be adopted. The higher layer, may be any layer in the architecture that is higher than the layer responsible for the broadcasting of messages in the mesh network. In an embodiment, the higher layers are the host layers of the node transmitting the messages.

In a second aspect of the present disclosure, there is presented a mesh node arranged for operation in a mesh network comprising a plurality of communicatively interconnected mesh nodes, wherein said mesh node comprises:
receive equipment arranged for receiving a message to be forwarded in said mesh network;
process equipment arranged for determining that said message to be forwarded is to be unicasted to a particular neighbour mesh node of said mesh node, said particular neighbour mesh node being one hop away from said mesh node;
transmit equipment arranged for unicasting said message to be forwarded to said particular neighbour mesh node a plurality of times, wherein each time delay between subsequent messages is predetermined.

The advantages of the first aspect of the disclosure being a method of forwarding a message in mesh network are also inherently a part of the second aspect of the disclosure. Furthermore, it is pointed out that although the claims read as if all the equipments according to the present disclosure are incorporated into a single node, a person skilled in the art understands that the same disclosure could be implemented by, distributing the equipments over several nodes. As an example, nodes in wireless mesh network often have very low processing power and therefore, the process equipment may be located centrally in a node which has a higher processing power. Such a solution, although not preferable, may also require additional signalling between said central node and the node forwarding the message.

In an embodiment according to the second aspect of the disclosure, the transmit equipment is arranged for unicasting said message to be forwarded to said particular neighbour mesh node at least three times, wherein each time delay between subsequent unicasted messages is equal.

In an example according to the second aspect of the disclosure, each time delay is between 100 μs and 200 μs.

In a further embodiment according to the second aspect of the disclosure, the mesh node and said particular neighbour mesh node have an established friendship relationship.

In an example according to the second aspect of the disclosure, the process equipment is arranged for determining that a friendship relationship is established between said particular neighbour mesh node and said mesh node.

According to an embodiment of the second aspect of the present disclosure the process equipment is arranged for:
comparing a Network identifier field in a header portion of said received message to a corresponding field of messages to be transmitted;
determining that said messages are to be unicasted when said two network identifiers are different.

In a third aspect of the present disclosure, there is presented a computer program product containing computer program code which, when executed by a mesh node, cause the mesh node to implement a method according to the present disclosure.

According to a third aspect of the disclosure, there is provided a computer readable storage medium comprising instructions which when loaded on to one or more nodes in a mesh network are arranged for performing any of the methods as explained above.

According to a fourth aspect of the present disclosure, there is presented a mesh node for operation in a mesh network comprising a plurality of communicatively interconnected mesh nodes, wherein said mesh node comprises:
receive module for receiving a message to be forwarded in said mesh network;
process module for determining that said message to be forwarded is to be unicasted to a particular neighbour mesh node of said mesh node, said particular neighbour mesh node being one hop away from said mesh node;
transmit module for unicasting said message to be forwarded to said particular neighbour mesh node a plurality of times, wherein each time delay between subsequent messages is predetermined.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
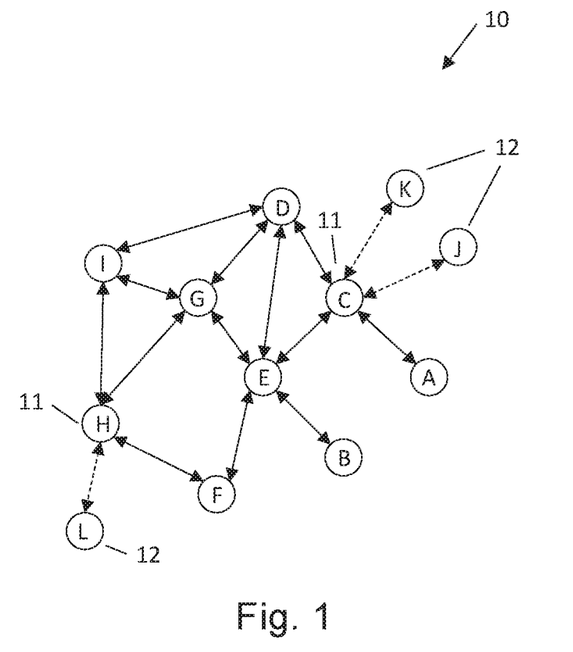
FIG. 1 schematically illustrates a plurality of nodes in a wireless mesh network.

FIG. 1 schematically illustrates a plurality of nodes in a wireless mesh network, 10. A mesh network comprises of a plurality of network elements referred to as nodes. A device that is not a member of a mesh network is known as an un-provisioned device and a device that is a member of a mesh network is known as a node. In the network 10, A-L represent nodes in the network.

Certain nodes in the network may also be Low-Power nodes. Such Low-Power nodes may be, for example, powered via a battery or obtain energy through any known energy harvesting means. In the network 10, nodes J, K, L represented by reference number 12 are Low power nodes.

Devices needing low power support can associate themselves with an always-on node, 11, that stores and relays messages on their behalf, using the concept known as "Friendship". Friendship is a special relationship between a Low Power node 12 and one neighbouring Friend node 11. These nodes must be within a single hop of each other and in the same subnet. A Friend node may be friends with multiple Low Power nodes, for example node C is a friend of both nodes K and J. A Low Power node can only be friends with a single Friend node.

All communication within a mesh network 10 is accomplished by sending messages. Messages operate on states. For each state, there is a defined set of messages that a server supports and a client may use to request a value of a state or to change a state. A server may also transmit unsolicited messages carrying information about states and/or changing states.

Furthermore, The Network Protocol Data Unit, PDU, comprises of a Network Identifier, NID. The NID is used to authenticate and encrypt a particular Network PDU.

Figure 2:
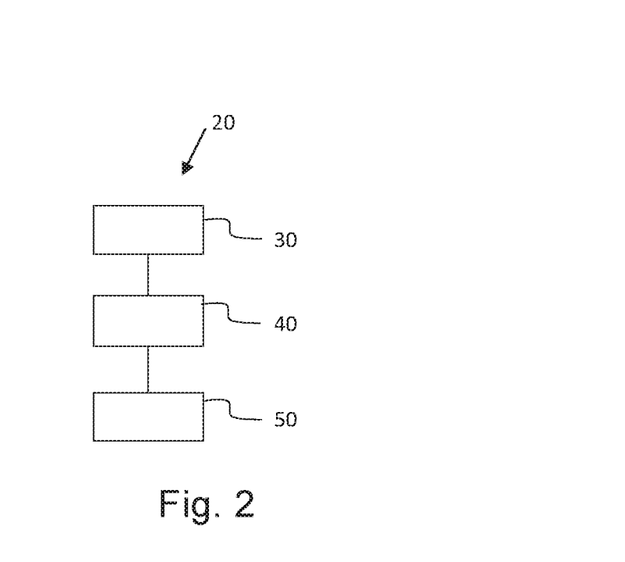
FIG. 2 schematically illustrates a method according to the present disclosure.

FIG. 2 schematically illustrates a method 20 according to the present disclosure. In a first step, the node 11 receives an incoming message. Such a message is either to be retransmitted in the network or to be unicasted to its friend node, if applicable. In a step 40 of determining, the node then determines whether the message is to be broadcasted within the mesh network or to be unicasted to a Low Power node with which the node has established a Friendship relation.

In the step 40 of determining, if it is established that the received message is to be unicasted to a Low Power node, the node in a step 50 of forwarding, forwards the intended message to the Low Power node in a compact mode of transmission. In the compact mode, subsequent messages are transmitted with a fixed time delay in between them as opposed to the common practice of a randomly generated time delay. The method 20 may be better understood with the help of FIGS. 3 and 4.

Figure 3:
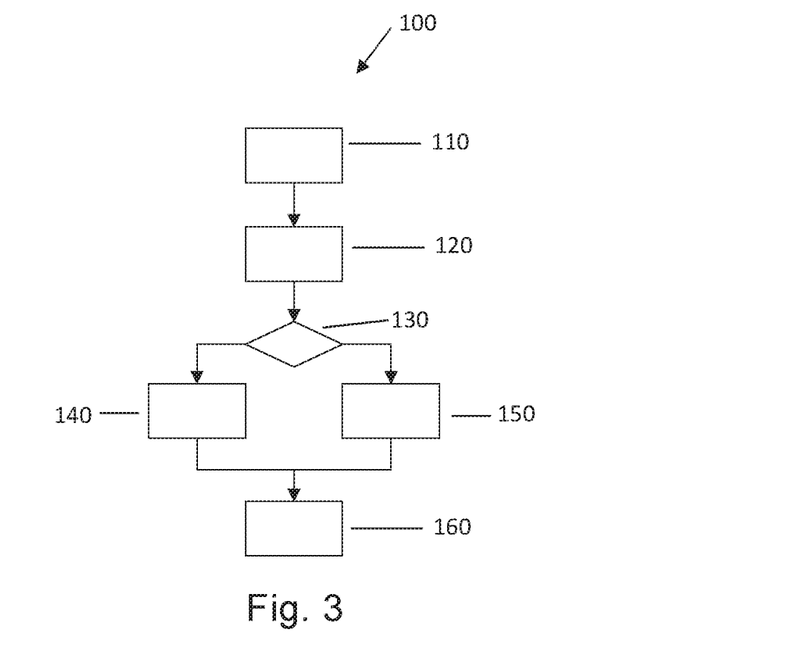
FIG. 3 schematically illustrates a method according to the present disclosure.

FIG. 3 schematically illustrates a method 100 according to the present disclosure. In a step 110, the message to be transmitted is received by a node. Upon receiving a message, the node shall check if the value of the NID field matches one or more known NIDs. If the NID field value does not match a known NID, then the message shall be ignored. The node shall further check if the message was previously transmitted by the same node, if yes, the node shall not retransmit the message. Instead, the message will be discarded.

If the NID field value is a known value and if the message was not previously transmitted, the node will then determine if the message is to be broadcasted to all of its neighbouring nodes or unicasted to a Low Power node. One way to determine whether the message is to be broadcasted or unicasted is to check the number of intended receivers. This is done in step 130.

If the number of intended receivers is 1, it is determined that the message is to be unicasted, and a compact mode of transmission is selected 150. If on the other hand, the number of intended receivers is more than one, it is determined by the node that the message is to be broadcasted, and a random mode of transmission is selected 140. Subsequently, in a step 160, the message is transmitted by the node based on the selected mode of transmission.

The Bluetooth low energy protocol stack (or protocol stack) consists of a controller and a host. This separation of controller and host derives from the implementation of classic Bluetooth Basic Rate, BR/Enhanced Data Rate, EDR devices, where the two sections are implemented separately. Any profiles and applications sit on top of the General Access Profile, GAP, and Generic Attribute Profile, GATT, layers of the protocol stack. The Host-Controller Interface, HCI, layer provides communication between the host and controller through a standardized interface. This layer can be implemented either through a software Application Programming Interface, API, or by a hardware interface such as Universal Asynchronous Receiver-Transmitter, UART, Serial Programming Interface, SPI, or Universal Serial Bus, USB. The Specification of the Bluetooth System describes Standard HCI commands and events.

In an embodiment, the Host layer informs the Controller about the nature of the message by sending a command through the Host-Controller Interface. The controller operates with a first mode (e.g., randomized mode) by default. The command is sent by the Host to enable and disable the operation according to the second mode (e.g., compact mode). Alternately, any of the higher layers—more specifically any of the host layers, may indicate to the physical layer the nature of the message. Such an information is passed to the physical layer through the Host-Controller Interface. When the physical layer receives an indication indicating the nature of the message, it may choose either the compact mode or the randomized mode.

In a further embodiment, exemplified in the context of Mesh messages, the Controller autonomously determine the nature of the message to be sent by collecting NID values from incoming messages in the network and comparing it with the NID value of the messages to be transmitted. If the same NID is used for incoming and outgoing messages, it means that the message belongs to a Mesh subnet and it is intended to be broadcast to multiple receivers. If the NID used for outgoing messages is not used by any other node, it indicates that the message has been generated in the context of Friendship between the node generating the message and a single receiving node, which can be a Low Power node.

Figure 4:
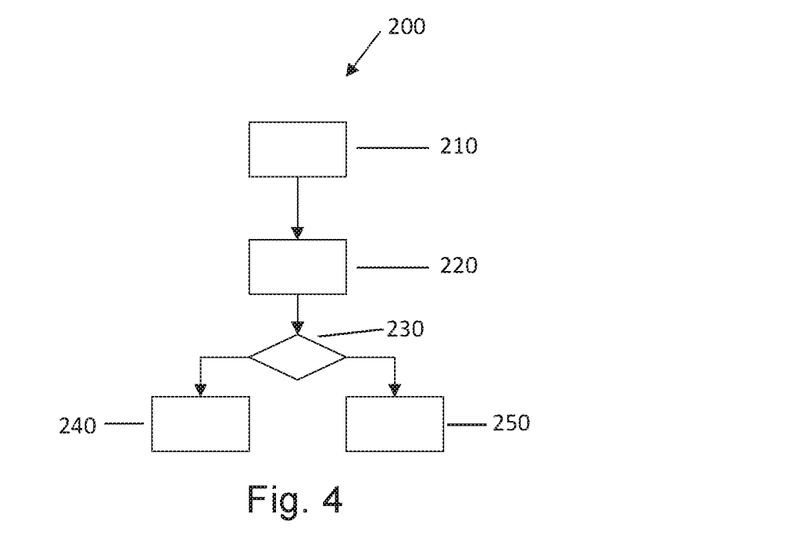
FIG. 4 schematically illustrates a method according to the present disclosure.

FIG. 4 schematically illustrates a method 200 according to the present disclosure. Specifically, the method 200 relates to another method for determining whether the message is to be broadcasted or unicasted. According to method 200, when a new message is received by a node, the NID of the incoming message is evaluated 210. In a next step 220, the NID of the message to be transmitted is also evaluated. In a step of 230, the two NIDs—i.e. the NID of the incoming message and the NID of the outgoing message—are compared. This follows from the fact that messages that are generated in the context of a Friendship between a Friend node and a Low Power node have an NID that is different from that of the NID used for transmitting messages between the other nodes.

Therefore if in step 230, it is determined that the NIDs are the same, i.e. the message is to be broadcasted in the mesh network, a random mode of transmission is selected 240. If on the other hand, the NIDs are found to be different tin step 230, a compact mode of transmission is selected 250. The two different modes of transmission, namely the compact mode and the random mode are illustrated in FIG. 5.

Figure 5:
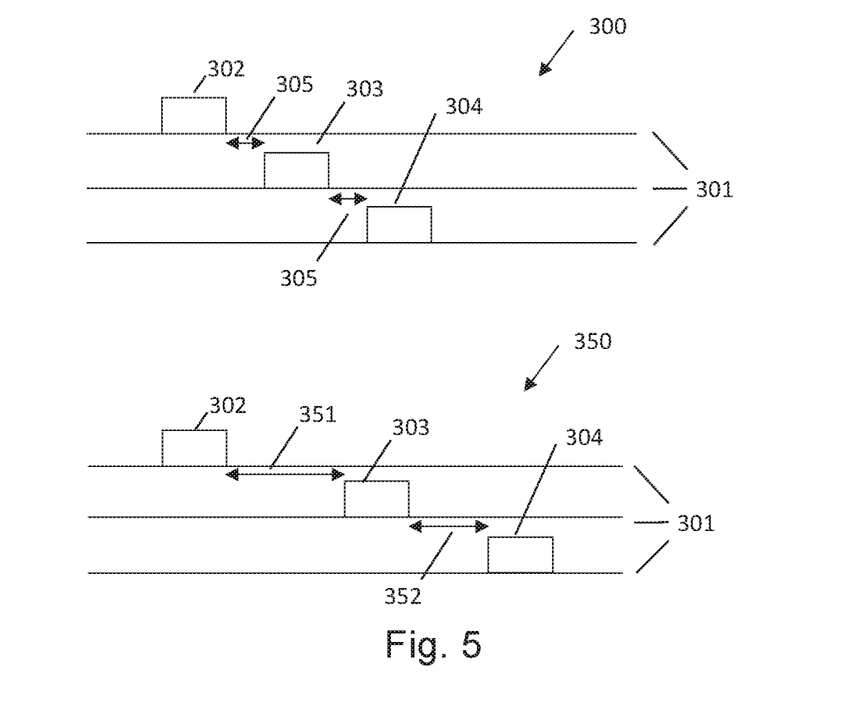
FIG. 5 schematically illustrates various modes of forwarding messages in a mesh network according to the present disclosure.

FIG. 5 schematically illustrates various modes of forwarding messages in a mesh network according to the present disclosure. The node implementing the solution has two modes for transmitting advertising packets at the controller. The first mode 300, also referred to as the compact mode, consists of transmitting advertising packets 302, 303, 304 on the three advertising channels 301 within an advertising event with minimum interval 305 between the transmissions allowed by the hardware (e.g., 150 us). The second mode 350, also referred to as the randomized mode or the random mode, consists of generating random delay components 351, 352 between a minimum value (e.g., 150 us) and a maximum value (less than 10 ms) to add between the transmission of advertising packets 302, 303, 304 within an advertising event. An example of the transmission of the advertising triplet in the two modes 300, 350 is reported in FIG. 5.

Figure 6:
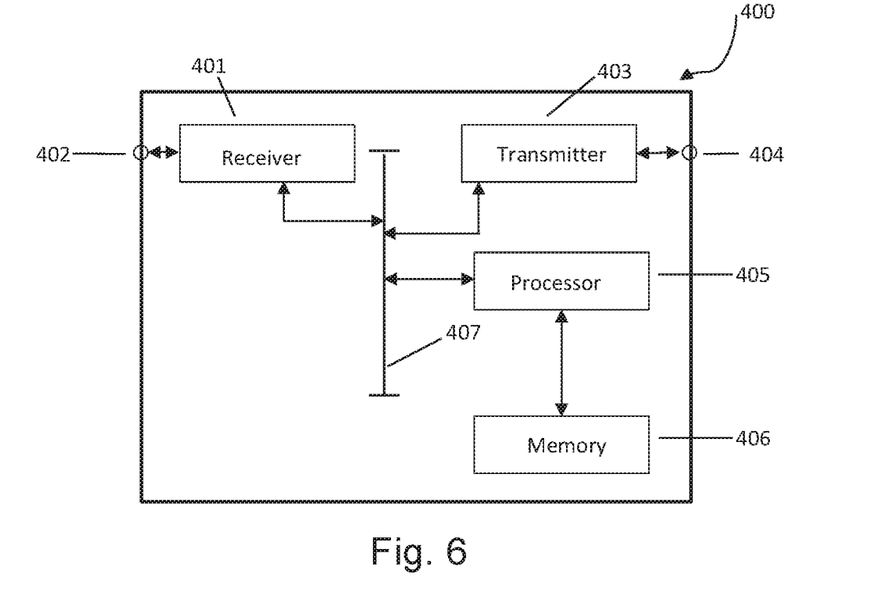
FIG. 6 schematically illustrates mesh node according to the present disclosure.

FIG. 6 schematically illustrates a mesh node 400 according to the present disclosure. The node 400 comprises of receive equipment 401 and 402. The receive equipment is arranged for receiving messages from other nodes in the mesh network. It further comprises of transmit equipment 403, 404 arranged to transmit message to other nodes in the mesh network based on the selected mode of transmission according to the present disclosure.

The process equipment 405 is arranged to determine whether or not the message to be transmitted is to be unicasted or broadcasted. The process equipment 405 may do so by identifying the number of intended receivers or by comparing the NID field available in the header of messages of incoming and outgoing messages. Once a mode of transmission is selected, the process equipment 405 instructs the transmit equipment 403, 404 to transmit messages based on the selected mode. The process equipment 405 may further be arranged to generate a random time delay between subsequent transmissions when a randomized mode of transmission is selected.

The mesh node 400 further comprises a memory 406 which is arranged to store incoming messages. Incoming messages are normally compared with messages already stored within the memory 406 to see if they have already been received and transmitted. Such a comparison may also be performed by the process equipment 405. If an incoming message is already stored in the memory, it implies that the message has already been transmitted by the node. Hence such a duplicate message may be discarded by the node, without being transmitted by the node. The memory 406 may further be arranged to store a computer program product which when executed by the memory 405 causes the node to perform a method according to the present disclosure.

Other variations to the disclosed examples can be understood and effected by those skilled in the art in practicing the claimed disclosure, from a study of the drawings, the disclosure and the appended claims. In the claims, the word "comprising" does not exclude other elements or steps, and the indefinite article, "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method, performed by a first mesh node in a wireless mesh network, of forwarding a received message in the wireless mesh network, the method comprising:
   receiving, from a third mesh node in the wireless mesh network, a message whose destination is a second mesh node in the wireless mesh network; and
   forwarding a plurality of repetitions of the message to the second mesh node, wherein:
      successive repetitions of the message are separated by respective time delays, and
      the respective time delays are based on whether the first mesh node has an established friendship relationship with the second mesh node.

2. The method of claim 1, further comprising establishing a friendship relationship with the second mesh node.

3. The method of claim 2, wherein:
   at least three repetitions of the message are forwarded by unicast transmission; and
   the respective time delays are equal and have a value between 100 μs and 200 μs.

4. The method of claim 2, wherein receiving the message whose destination is the second mesh node comprises determining that the message is intended only for the second mesh node.

5. The method of claim 4, wherein determining that the message is intended only for the second mesh node comprises:
   comparing a Network Identifier field in a header portion of the received message to corresponding fields of one or more other messages to be broadcast by the first mesh node; and determining that the message is intended only for the second mesh node when contents of the Network Identifier field and the corresponding fields of the other messages are different.

6. The method of claim 4, wherein determining that the message is intended only for the second mesh node comprises receiving, from a host layer in the first mesh node, an indication that the message is to be forwarded to a single destination.

7. The method of claim 2, further comprising receiving a polling signal from the second mesh node, wherein said polling signal indicates that the second mesh node is active and is able to receive messages.

8. The method of claim 7, further comprising:
storing the received message in a friend queue for the second mesh node; and
in response to the polling signal, retrieved the message from the friend queue and forwarding retrieved message to the second mesh node.

9. The method of claim 1, wherein:
the first mesh node does not have an established friendship relationship with the second mesh node;
at least three repetitions of the message are forwarded by broadcast transmission; and
the respective time delays are random values between 100 µs and 10 ms.

10. A first mesh node configured for operation in a wireless mesh network, the first mesh node comprising:
transmitter and receiver configured to communicate with a plurality of other mesh nodes in the wireless mesh network;
a processor operably coupled with the transmitter and receiver; and
a non-transitory, computer-readable storage medium comprising instructions that, when executed by the processor, configure the first mesh node to:
receive, from a third mesh node in the wireless mesh network, a message whose destination is a second mesh node in the wireless mesh network; and
forward a plurality of repetitions of the message to the second mesh node, wherein:
successive repetitions of the message are separated by respective time delays, and
the respective time delays are based on whether the first mesh node has an established friendship relationship with the second mesh node.

11. The first mesh node of claim 10, wherein the storage medium further comprises instructions that, when executed by the processor, configure the first mesh node to establish a friendship relationship with the second mesh node.

12. The first mesh node of claim 11, wherein:
at least three repetitions of the message are forwarded by unicast transmission; and
the respective time delays are equal and have a value between 100 µs and 200 µs.

13. The first mesh node of claim 12, wherein the instructions that configure the first mesh node to receive the message whose destination is the second mesh node further configure the first mesh node to determine that the message is intended only for the second mesh node.

14. The first mesh node of claim 13, wherein the instructions configure the first mesh node to determine that the message is intended only for the second mesh node by:
comparing a Network Identifier field in a header portion of the received message to corresponding fields of one or more other messages to be broadcast by the first mesh node; and
determining that the message is intended only for the second mesh node when contents of the Network Identifier field and the corresponding fields of the other messages are different.

15. The first mesh node of claim 13, wherein the instructions configure the first mesh node to determine that the message is intended only for the second mesh node by receiving, from a host layer in the first mesh node, an indication that the message is to be forwarded to a single destination.

16. The first mesh node of claim 11, wherein the storage medium further comprises instructions that, when executed by the processor, configure the first mesh node to receive a polling signal from the second mesh node, wherein said polling signal indicates that the second mesh node is active and is able to receive messages.

17. The first mesh node of claim 16, wherein the storage medium further comprises instructions that, when executed by the processor, configure the first mesh node to
store the received message in a friend queue for the second mesh node; and
in response to the polling signal, retrieve the message from the friend queue and forward the retrieved message to the second mesh node.

18. The first mesh node of claim 10, wherein:
the first mesh node does not have an established friendship relationship with the second mesh node;
at least three repetitions of the message are forwarded by broadcast transmission; and
the respective time delays are random values between 100 µs and 10 ms.

* * * * *